Oct. 8, 1963  D. J. CLOW  3,106,417
KNOT TYING DEVICE
Filed March 16, 1962
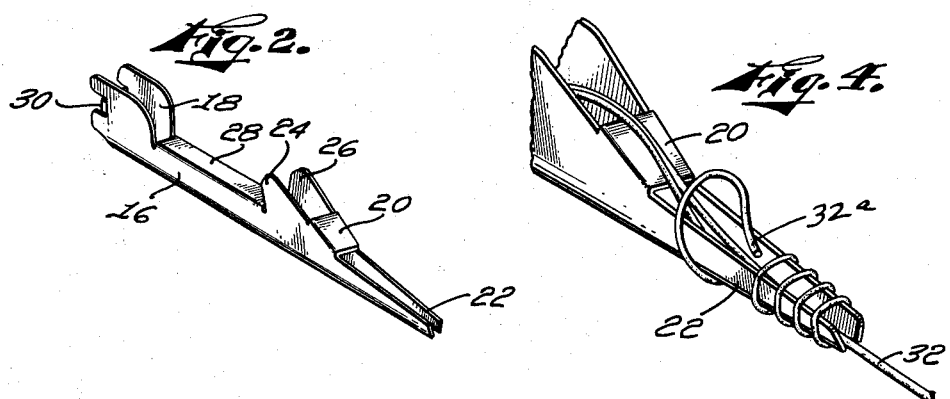
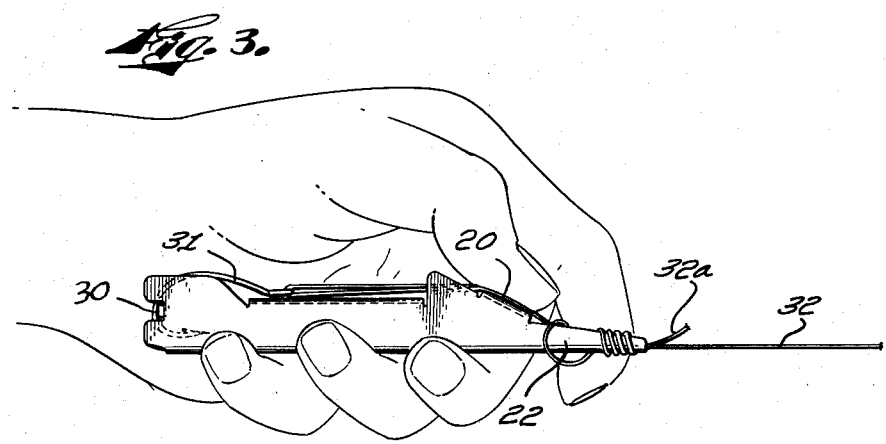
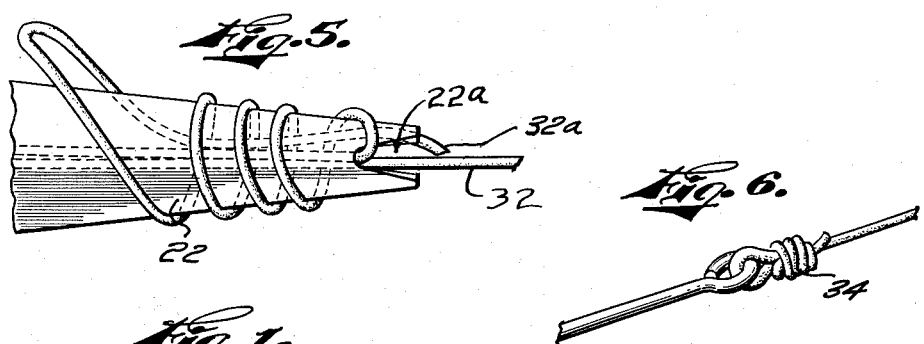
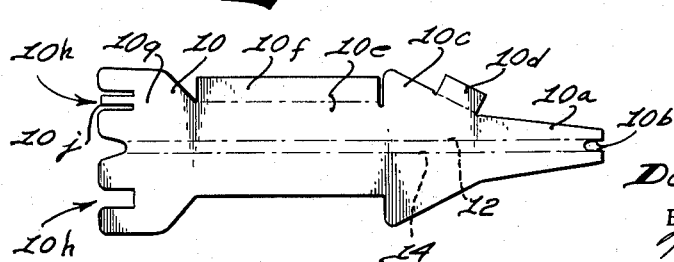
INVENTOR.
DONALD J. CLOW
BY
Noel F. Conway
ATTORNEY

United States Patent Office 3,106,417
Patented Oct. 8, 1963

3,106,417
KNOT TYING DEVICE
Donald J. Clow, 640 Oak St., Laguna Beach, Calif.
Filed Mar. 16, 1962, Ser. No. 180,151
8 Claims. (Cl. 289—17)

The present invention relates generally to knot tying devices, and more particularly to such devices for use in the sport and industry of fishing.

In the field of fishing, industrial and sport, extensive use has heretofore been made of various types of string or line, as for instance, braided and monofilament fishing lines. Whereas, braided lines are relatively flexible and hence can be easily and quickly tied into knots of various types, monofilament lines are relatively stiff and inflexible due to the fact that they are formed of a single strand or element. Typically, monofilament lines are made of plastic-like materials, such as, catgut, which is relatively inflexible and frictionless. This, together with the fact that monofilament lines, as the name implies, are formed of a single strand makes it relatively difficult to bend and shape such lines into firm, strong knots.

Such monofilament lines are often used as "leaders" to interconnect the fish hooks with the respective fish lines. When a "leader" is attached to a fish hook, the hook is referred to as being "snelled." In view of the above explained difficulties heretofore encountered in forming monofilament lines into knots, it has been difficult to quickly and easily produce "snelled" hooks, and to properly tie the hooks to the fish lines.

It is an object of the present invention to teach the construction and operation of a device for use in quickly and easily tying a substantially superior knot in virtually any kind of line or strand.

Another object of the present invention is to provide a knot tying device which is particularly well adapted for use in the sport and industry of fishing.

Another object of the present invention is to provide a knot tying device as characterized above which is operable to provide a variety of firm, strong knots in monofilament lines.

Another object of the present invention is to provide a knot tying device which is well adapted for quickly and easily producing "snelled" hooks.

Another object of this invention is to provide a device for use in splicing together several sections of line.

Another object of the present invention is to teach the construction of an article of manufacture which can be used as a fishing lure, if desired.

Another object of this invention is to teach the construction of an article of manufacture as characterized above for use as either a knot tying device or a fishing lure, as desired.

Another object of the present invention is to provide a device as characterized above which is simple and inexpensive to manufacture, and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a plan view of a stamping for use in forming a preferred embodiment of the subject knot tying device;

FIGURE 2 is a perspective view of a knot tying device according to the present invention;

FIGURE 3 is a side elevational view of the knot tying device of FIGURE 2 while being held in operating position;

FIGURE 4 is a fragmentary perspective view of the knot tying device of FIGURE 3;

FIGURE 5 is an enlarged fragmentary bottom view of the knot tying device as shown in FIGURE 4; and FIGURE 6 is a fragmentary perspective view showing a completed knot in a line fastened to a fish hook or the like.

Like reference characters indicate corresponding parts throughout the several views of the drawings.

Referring to the drawings, wherein is shown a preferred form of the present invention, FIGURE 1 shows a stamping 10 formed of substantially any formable sheet material. Although stamping 10 is presently formed of sheet metal, it is also within the purview of the instant invention, that the subject device could be produced of plastic or any other appropriate material. As will be realized by those persons skilled in the art, sheet metal stampings as shown in FIGURE 1 can be formed in large quantities for relatively little cost.

Stamping 10 in its flat form as shown in FIGURE 1, is provided with a tapered end portion 10a formed with a notch or cut-out 10b. Adjacent end portion 10a is an enlarged tapered portion 10c having a tab, or ear, 10d formed along one edge thereof.

Stamping 10 is further formed with an intermediate portion 10e, along one edge of which there is provided a tab 10f which extends the entire length of such intermediate portion. Adjacent intermediate portion 10e is an enlarged end portion 10g having two pairs of fingers 10h, the fingers of one of said pairs being separated by a tab 10j.

In forming the completed knot tying device as shown in FIGURE 2, the tabs 10d, 10f and 10j are first bent so as to provide a right angle with respect to the adjacent portions of stamping 10. After this has been accomplished, the two sides of the stamping 10 are each bent substantially 90° toward the other along the broken lines 12 and 14 shown in FIGURE 1 to give the device a substantially U-shaped cross-section. As shown in FIGURE 2, this provides a pair of opposite side walls 16 and 18 for the knot tying device. The tab 10d provides a support 20 immediately to the rear of the tapered forward end portion, or mandrel, 22 of the device. Although not mandatory for successful practice of the present invention, it has been found preferable to form side walls 16 and 18 in non-parallel relation between support 20 and the cutout 22a such that said side walls are arranged in tapered fashion as shown in FIGURES 2 and 4. Immediately behind support 20 in the completed device is a pair of guides 24 and 26 which are provided by the enlarged tapered portion 10c of the stamping 10.

The elongated tab 10f on the intermediate portion 10e of stamping 10 provides a support or platform 28 for supporting the shank of a fish hook, or several strands of fish lines as will hereinafter be explained.

The aforementioned bending along lines 12 and 14 causes the tab 10j intermediate the fingers of said one pair of fingers 10h, to extend between the side walls 16 and 18 at the rear thereof. Thus there is provided transverse supporting arm 30 at the rear of the device. As will be seen, the arm 30 and the fingers 10h function singularly or jointly to prevent the object, e.g., a fish hook, to which the line is being tied from moving toward the tapered forward end portion 22 during the knot tying operation.

Thus constructed, the knot tying device is utilized generally as follows:

In order to fix a fish line to a hook, it is first necessary to position the hook, such as shown at 31 in FIGURE 3, with its shank on the support 28 and the barbed end portion thereof partially encircling the transverse support member 30. It should be noted that the barbed point of the hook 31 is enclosed by the present device, and there is no danger of pricking the user of the device.

The line 32, which may be braided or of monofilament construction as desired, is then threaded through the eye of hook 31. The line is then folded back on itself and the adjacent strands positioned between the guides 24 and 26, and across the support, or pressure plate 20. It then becomes a simple matter to retain such strands on the support 20 by means of moderate finger pressure as shown in FIGURE 3. Such position is easily attained by the operator gently, but firmly holding the device as shown in said FIGURE 3. This arrangement keeps a slight tension on the strands of line 32 so as to maintain hook 31 in proper position on the knot tying device as above described. This arrangement also facilitates effecting proper tension on the knot as can be seen.

The end 32a of line 32 is then drawn downwardly within the notch or cut-out 22a in the forward end portion 22 of the device, and thereafter is wrapped about the tapered end portion 22 progressing from the smallest portion to the widest portion thereof as shown most clearly in FIGURES 4 and 5. Although the end 32a of line 32 may be wrapped only two or three times about the tapered end portion 22, it has been found most desirable in providing a firm strong knot in monofilament line to wrap end 32a four times about such end portion.

The end 32a of line 32 is then inserted between the upstanding sidewalls of the tapered forward end portion 22 so that it extends beneath the aforedescribed turns or loops of the line. The end of line 32 is then brought out of the device parallel to the main portion of line 32 as shown most clearly in FIGURE 3 of the drawings.

Thereafter, it is a simple matter to gently but firmly pull end 32a away from the device so as to cause all of the turns or loops of the line to be drawn from the tapered end portion 22. Thus, the turns or loops are caused to be free of the knot tying device so as to be drawn tightly about the line 32.

Then, while continuing to grasp the device in one hand the line 32 is grasped in the other hand and pulled until the turns are moved snug against the hook eye. The end 32a of the line can then be cut or severed near the knot 34 to complete the fastening operation.

In order to permit greater live bait action, the line 32 should not be pulled until the turns are snug against the hook eye. Rather, the turns should be moved to a position so as to leave a small loop in the line around the hook eye. The end 32a of the line can then be cut or severed near the knot 34 to complete the fastening operation.

In the event hook 31 is relatively small, it's curved end portion may be positioned about the rearward edge of support 28 rather than about the transverse support member 28. This will properly position the small fish hook with its shank resting on support member 28 as above described.

The present device can be used to secure a line to a relatively large object, such as a trolling jig. In such case, the line is passed through the eye of the jig and the jig eye is located abutting the transverse arm 30. Then, with the fingers 10h retaining the line around the rear end of the device the knot tying process is completed substantially the same as described above.

As will be readily understood by those persons skilled in the art, the aforedescribed knot tying device and method of utilizing the same, may be employed to secure a line to substantially any object or article. Also, such device and method of use may be employed for tying the ends of two separate lines together by forming such a knot on each of the respective line ends. That is, by bending or looping the two lines about each other, and thereafter positioning such lines in the subject device and tying a pair of opposed knots in the manner described above, the lines can be firmly spliced together.

If it is desired to form the knot on the shank of the hook, the following method is used. The line 32 is threaded through the hook eye and laid along the shank. The hook is laid in the groove of the tapered end portion 22 with the hook eye toward the support 20 and the barbed portion extending beyond the end of the mandrel. Then the line end 32a is lead through the notch 22a and wrapped around the tapered portion 22 as in forming the other knot. Then the end 32a is threaded back through the loops as in the other knot. At that time, by lightly jerking on line end 32a, the hook is removed from the tapered portion 22. Then, by drawing on the line 32 the loops are tightened onto the shank of the hook. At that point, the knot is pushed against the hook eye, and the end 32a is trimmed off as in the case of the other knot.

It is also contemplated within the scope of the instant invention, that the subject knot tying device as shown in FIGURE 2 may be employed as a fish lure. Suitable hook means, as for instance, a treble hook, can be secured to the transverse supporting arm 30 by a line extending under the support members 20 and 28. In this event, the knot tying device can be used in attracting and catching fish as it is drawn through the water.

It is thus seen that the present invention provides a knot tying device which can be used for fastening a line to substantially any kind of article. Also, within the scope of the present invention, various kinds and styles of knots can be quickly and easily provided in different kinds of lines for effecting such fastening operations.

Although I have shown and described certain specific embodiments of my invention, I am fully aware that many modifications thereof are possible. The invention itself, therefore, is not to be restricted except insofar as is necessitated by the prior art and by the spirit of the appended claims.

I claim:

1. A knot tying device for tying a flexible line to an object comprising in combination, an elongated substantially U-shaped body having a pair of spaced parallel side members joined by an intermediate member, said side members being formed with adjacent tapered end portions, a support extending between said side members adjacent to tapered end portions thereof, a supporting arm extending between said side members at the end portion thereof opposite said tapered end portions, a platform between said side members intermediate said end portions, a V-shaped cut-out in said intermediate member at the reduced end of said tapered end portions, and a pair of shoulders at the enlarged end of said tapered end portions of said side members.

2. A knot tying device for tying a flexible line to an object, said device comprising:

an elongated body having a pair of spaced parallel side members joined by an intermediate member, said side members and intermediate member forming a substantially U-shaped cross-section, said side members being formed with adjacent tapered end portions at one end of the body;

a support extending between the side members adjacent to said tapered end portions thereof;

a supporting arm extending between said side members at the end portions thereof opposite said tapered end portions;

a V-shaped cut-out in said intermediate member at the reduced end of said tapered end portions;

and a pair of shoulders at the enlarged end of said tapered end portions of said side members.

3. A knot tying device for tying a flexible line to an object, said device comprising:

an elongated body having a pair of adjacent but spaced side members joined by an intermediate member forming a substantially U-shaped cross-section for the body, said side members being formed with adjacent tapered end portions;

a supporting arm extending between said side members at the end portion thereof opposite said tapered end portion;

a V-shaped cut-out in said intermediate member at the reduced end of said tapered end portions.

4. The knot tying device set forth in claim 3 wherein said side members are closer to each other at the reduced end of said tapered end portions than at the enlarged end of said tapered end portions.

5. A knot tying device for tying a flexible line to an object, said device comprising:

a pair of adjacent but spaced elongated side members, said side members being tapered at one end thereof toward said one end;

an intermediate portion joining the side members at said other end forming with the side members a substantially U-shaped cross-section for the device at said other end;

a transverse support arm extending between said side members at said other end at a point spaced from said intermediate portion, whereby the device is adapted to receive the point of a fish hook partially encircling said transverse support within the protected area between the side members, the intermediate portion and the transverse support arm;

and a support extending between the side members adjacent said tapered end and adapted to receive pressure from a portion of the hand of the user for the purpose of retaining a line extending from said other end of the side members across the support to said tapered end during the knot tying operation.

6. A knot tying device for tying a flexible line to an object, said device comprising:

a pair of adjacent but spaced elongated side members, said side members being tapered at one end thereof toward said one end;

means at the other end of the side members for at least partially receiving the object to which the line is to be tied and preventing the object so received from moving in the direction toward said one end;

a support extending between said side members and adapted to receive pressure of a portion of the hand of the user engaging a line extending from said means across the support to the tapered end portion for the purpose of retaining the line during the knot tying operation.

7. The device set forth in claim 6 wherein said means comprises a transverse support arm extending between the side members and adapted to receive there around a fish hook.

8. The device set forth in claim 6 wherein said means comprises:

a transverse support arm extending between the side members, and a plurality of fingers on said side members which fingers project beyond said transverse support arm.

References Cited in the file of this patent

UNITED STATES PATENTS

| | | |
|---|---|---|
| 2,758,858 | Smith | Aug. 14, 1956 |
| 2,825,592 | Semple | Mar. 4, 1958 |